United States Patent [19]

Yogosawa et al.

[11] 3,838,961
[45] Oct. 1, 1974

[54] INJECTION-BLOW MOLDING APPARATUS

[75] Inventors: Tsuneo Yogosawa; Masahiro Shoji, both of Numazu, Japan

[73] Assignee: Toshiba Kikai Kabushiki Kaisha, Tokyo, Japan

[22] Filed: Oct. 23, 1973

[21] Appl. No.: 408,586

Related U.S. Application Data

[63] Continuation of Ser. No. 214,705, Jan. 3, 1972, abandoned.

[52] U.S. Cl. 425/242 B, 425/DIG. 205, 425/DIG. 209
[51] Int. Cl. .......................... B29c 1/16, B29c 5/06
[58] Field of Search ... 425/242 B, DIG. 209, 324 B, 425/326 BJ, DIG. 203, DIG. 205, 326 B, 387 B; 264/97

[56] References Cited
UNITED STATES PATENTS

| | | | |
|---|---|---|---|
| 3,408,691 | 11/1968 | Ruekberg | 425/326 BJ X |
| 3,752,615 | 8/1973 | Van Manen | 425/242 B |

FOREIGN PATENTS OR APPLICATIONS 45-30,592    10/1970    Japan

*Primary Examiner*—J. Spencer Overholser
*Assistant Examiner*—David B. Smith
*Attorney, Agent, or Firm*—Wenderoth, Lind & Ponack

[57] ABSTRACT

In injection-blow molding apparatus of the type comprising a stationary die plate, a movable die plate, an injection molding female mold secured to the stationary die plate, a blow molding female mold secured to the movable die plate, and a male mold disposed between the injection molding female mold and the blow molding female mold and wherein a parison is injection molded about the male mold by the cooperation thereof with the injection molding female mold and then the male mold carrying the parison is combined with the blow molding female mold to blow mold the parison, there are provided a horizontal beam extending above the stationary and movable die plates, a male mold supporting member having male molds on its opposite sides and a vertical shaft, a carriage rotatably supporting the vertical shaft and slidably mounted on the beam.

2 Claims, 6 Drawing Figures ial mold assembly 7 and the blow molding female
INJECTION-BLOW MOLDING APPARATUS This is a continuation of application Ser. No. 214,705, filed Jan. 3, 1972, now abandoned.

BACKGROUND OF THE INVENTION

This invention relates to improved injection-blow molding apparatus including a rotatable male mold assembly to alternately cooperate with an injection molding female mold and a blow molding female mold.

To have better understanding of the advantages of this invention, reference is first made to FIGS. 1 and 2 showing a conventional injection-blow molding apparatus comprising injection molding female molds 2 mounted on a stationary die plate 1, blow molding female molds 4 mounted on a movable plate 3 and a core or male mold assembly 6 slidably mounted on tie bars 5 extending between die plates 1 and 3. Assembly 6 contains a male mold block 7 to be rotatable about in a horizontal axis. The male mold block 7 includes a plurality of horizontal male molds 8 on the opposite sides thereof. The male mold block 7 is rotated 180° about a horizontal axis by means of a piston-cylinder assembly 9 through a rack-pinion mechanism not shown. Male molds 8 are moved in the horizontal direction by moving the assembly 6 by means of a piston cylinder assembly 10 secured to die plate 1.

The injection-blow molding apparatus shown in FIG. 1 operates as follows. First, injection molding female molds 2, male mold block 7 and blow molding female molds 4 are clamped together as shown in FIG. 2A. Parisons 50 are injection molded in the injection molding female mold 2 about male molds 8, while in the blow molding female molds 4, parisons molded about male molds 8 on the opposite side during the previous injection molding step are blow molded by compressed air blown into the parisons through male molds on the left hand side of the assembly. Parisons 50 on the male molds 8 are maintained at a temperature suitable for blow molding by heated medium circulated through male molds. Then, injection molding female molds 2 and blow molding female molds 4 are separated from male mold assembly 7 and the blow molding female molds 4 are opened to remove the products 51 from the blow molding female molds as shown in FIG. 2B. At this time, parisons 50 injection molded by the previous step are maintained on the male molds 8 on the right hand side. Then, piston-cylinder assembly 9 is operated to rotate the male mold assembly 6 by 180° to the position shown in FIG. 2C. Thereafter, blow molding female molds 4 are again closed to enclose the parisons, and the blow molding female molds, male mold assembly and injection molding female molds are clamped together as shown in FIG. 2D to perform the next injection and blow molding operations.

Although the injection-blow molding apparatus of the type described above is advantageous in that it is possible to construct the apparatus as a compact structure, since the male mold block 7 is supported by horizontal shafts (not shown) extending on the opposite sides thereof and moreover since male mold assembly 6 is slidably mounted on tie bars 5, mounting and dismounting of the male mold assembly 6, male mold block 7 and male mold 8 are extremely troublesome. Moreover, it is difficult to remove difficult to remove defective parisons. Further, as the heated medium for adjusting the temperature of the male molds is passed through the rotary shaft supporting the male molds, not only the construction is complicated but also temperature rise and heat expansion of the shaft are unavoidable. As tie bars 5 must support the weights of movable plate 3, blow molding female molds 4 and the male mold assembly 6, deflection and wear thereof are large thus causing eccentric respective molds. Moreover, the stroke of the movable plate is great, thus complicating the construction and operation of the molding apparatus.

Such difficulties are especially remarkable when a blow molding machine is incorporated into an existing injection molding machine.

SUMMARY OF THE INVENTION

It is an object of this invention to provide an improved injection-blow molding apparatus capable of eliminating the difficulties described above.

Another object of this invention is to provide an improved injection-blow molding apparatus, in which it is easy to remove unsatisfactory parisons, can bring the male dies in front of the operator, and to relieve the tie bars from the weight of the male mold assembly.

A futher object of this invention is to provide an improved construction by which a blow molding machine can be readily combined with an existing injection molding machine.

A still further object of this invention is to provide an improved injection-blow molding apparatus wherein heated the medium for controlling the temperature of the male mold and the compressed gas for blow molding can be supplied through the male molding member without affecting its bearing.

According to this invention, in an injection-blow molding apparatus of the type comprising a stationary die plate, a movable die plate, an injection molding female mold secured to the stationary die plate, a blow molding female mold secured to the movavle die plate, and a male mold disposed between the injection molding female mold and the blow molding female mold and wherein a parison is injection molded about the male mold by the cooperation thereof with the injection molding female mold and then the male mold carrying the parison is combined with the blow molding female mold to blow mold the parison, there are provided a horizontal beam extending above the stationary and movable die plates, a male mold supporting member having male molds on its opposite sides and a vertical shaft, a carriage rotatably supporting the vertical shaft and slidably mounted on the beam, and means for moving the carriage along the beam.

DESCRIPTION OF THE PREFERRED EMBODIMENT

Figure 1:
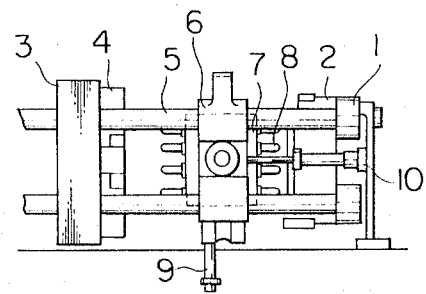
FIG. 1 shows a side elevation of a prior art injection-blow molding apparatus.

The preferred embodiment of this invention shown in FIGS. 3 to 6 comprises a stationary die plate 11, a movable die plate 12, and a horizontal beam or bridge 13 interconnecting the upper ends of die plates 11 and a stationary side plate 38. A carriage 16 for suspending a male mold supporting member 23 is slidably mounted on beam 13 by means of a slide surface 14 and a guide rod 15. The carriage 16 is moved along beam 13 by means of a horizontal piston cylinder assembly 17. A vertical shaft 18 for supporting the male mold supporting member 23 is rotatably supported by a bearing 19 in the carriage 16 and is driven by a driving device 21 to rotate in the opposite directions or to perform intermittent indexing rotations of 180°. The male mold supporting member 23 is secured to a flange 22 at the lower end of rotary shaft 18. It is advantageous to interpose a layer of heat insulating material 24 between flange 22 and male mold supporting member 23 for preventing the transfer of heat from member 23. A plurality of male molds 25 are mounted horizontally on the parallel opposite side surfaces of the male mold supporting member 23. Further, dowel pins 28 (see FIG. 5) are secured to the side surfaces for assuring accurate centering of the male molds with respect to injection molding female molds 26 and blow molding female molds 27 which are mounted on the inner surfaces of stationary and movable die plates 11 and 12, respectively. Heated medium for regulating the temperature of male molds 25 and compressed air for blow molding are supplied from the sources (not shown) through flexible hoses 35, a rotary joint 36 and passages (not shown) axially extending through the center of male mold supporting member 23. An auxiliary piston-cylinder assembly 29 may be provided for the stationary die plate to facilitate separation of male molds 25 from injection molding female molds 26.

Figure 2:
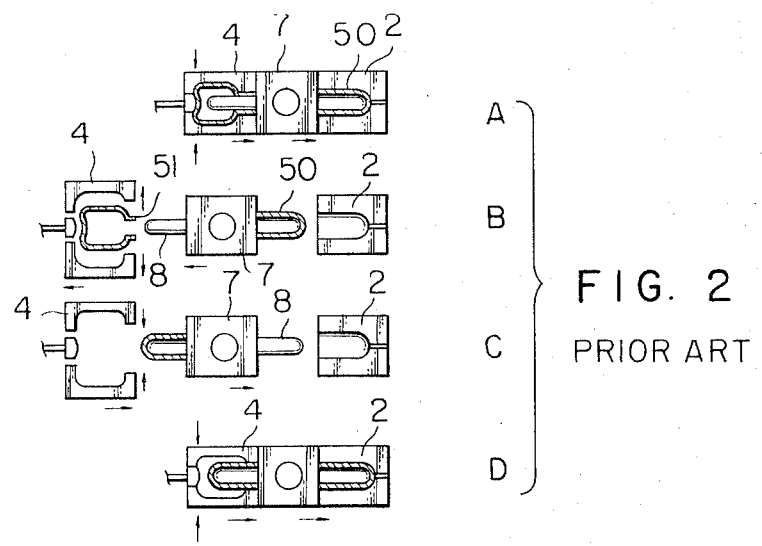
FIGS. 2A through 2D show diagrams for explaining the operation of the apparatus shown in FIG. 1.
Figure 3:
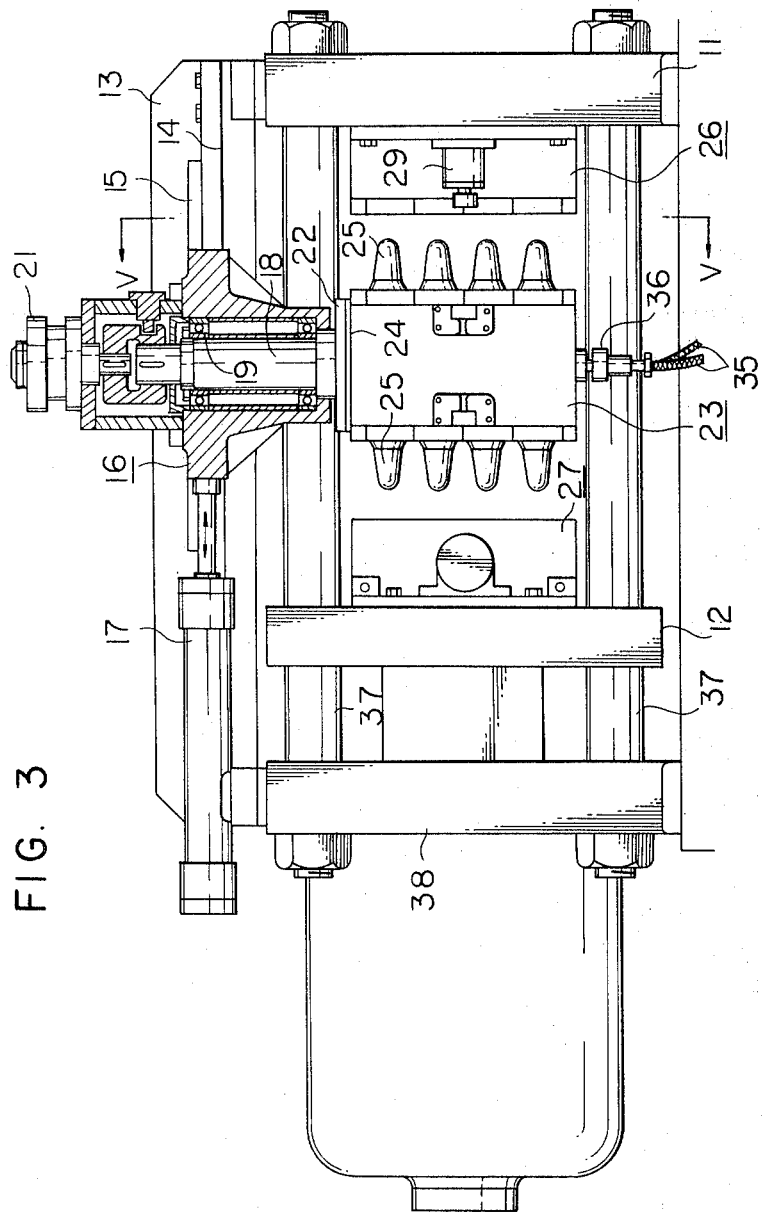
FIG. 3 is a side elevational view of the injection-blow molding apparatus constructed in accordance with this invention and maintained in the inoperative position.
Figure 4:
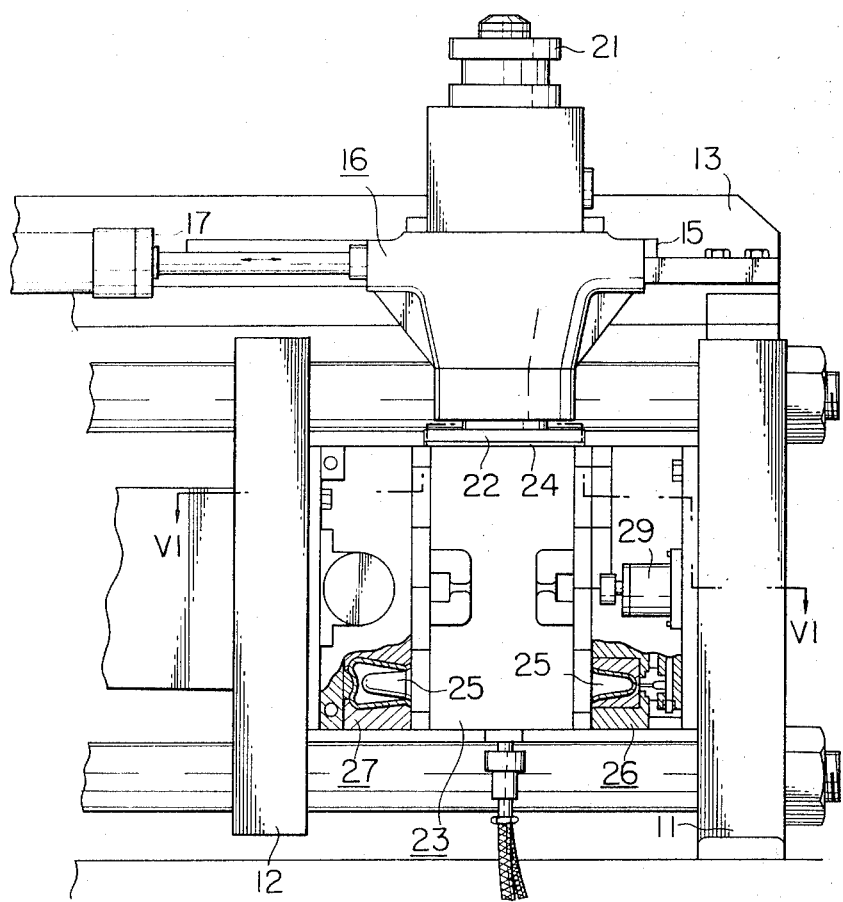
FIG. 4 is a side elevational view of the apparatus shown in FIG. 3 in the operative position.
Figure 5:
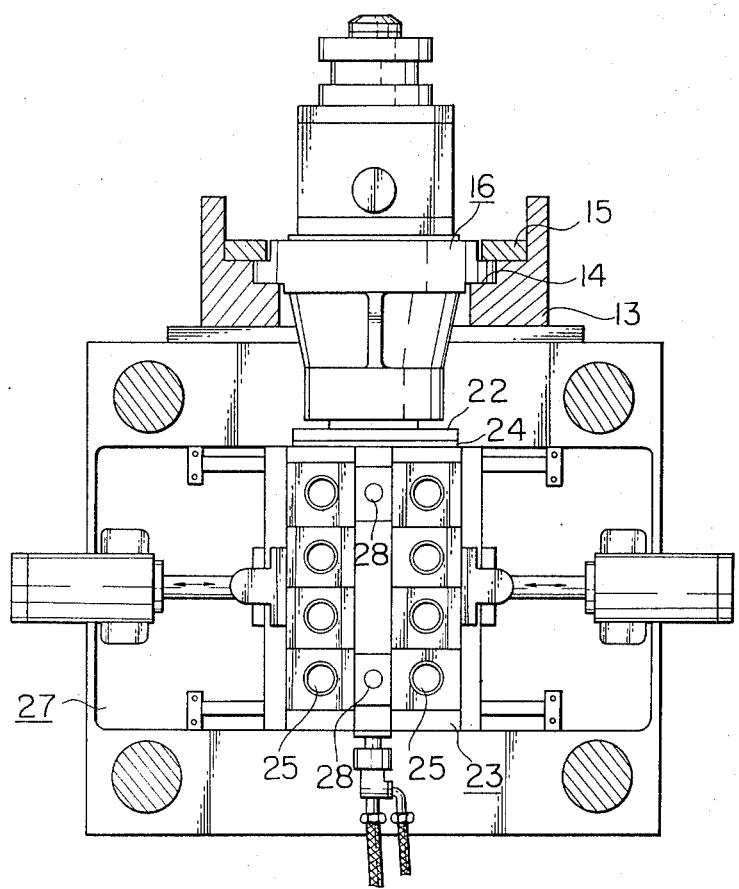
FIG. 5 is a cross-sectional view of the apparatus shown in FIG. 3 taken along a line V—V.
Figure 6:
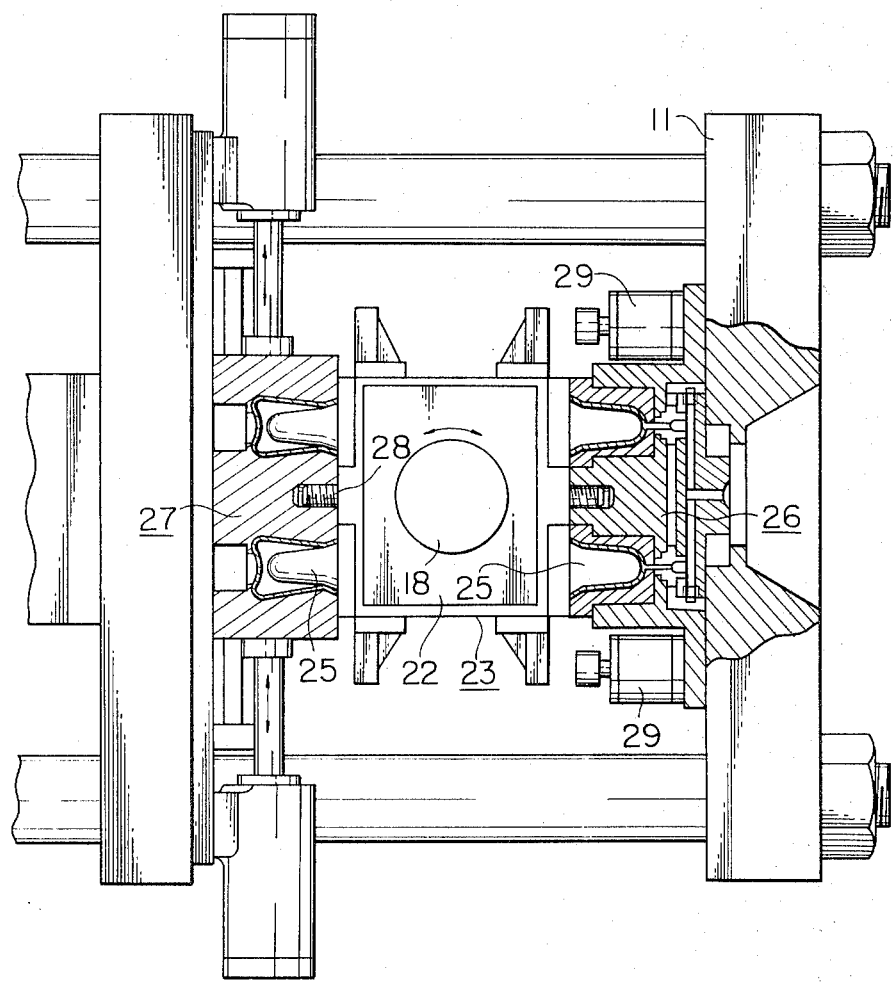
FIG. 6 shows a sectional view taken along a line VI—VI in FIG. 4.

The operation of the molding apparatus of this invention is identical to that described in connection with FIG. 2 except that in the prior molding apparatus the male mold supporting member is rotated about a horizontal axis, whereas the male mold supporting member of this invention is rotated about a vertical axis.

As above described, in accordance with this invention, the male mold supporting member 23 is suspended from beam 13 extending above stationary and movable die plates 11 and 12 so that the male mold supporting member 23 can be moved between the injection molding female molds and the blow molding female molds and can be rotated about a vertical axis so that there is no obstacle on the front or operator side of the molding apparatus. For this reason, it is easy to remove unsatisfactory parisons from the male molds by rotating to the front side the male molds carrying such parisons. In addition, mounting and dismounting of male molds 25, male mold supporting member 23, carriage 16 and beam 13 are greatly facilitated which is advantageous from the standpoint of operation and maintenance. Moreover, since it is possible to supply the heated medium for regulating the temperature of the male molds and the compressed air for blow molding without the necessity of passing them through rotary shaft 18, it is possible not only to simplify the construction but also to prevent bearing 19 from being damaged. Further, different from prior construction, as the weights of the male molds, male mold supporting member and the carriage for suspending these elements are not applied upon tie bars 37 between die plates 11 and side plate 38, wear and flexure thereof can be prevented. According to this invention, a blow molding machine can be readily incorporated to an existing injection molding machine without the necessity of modifying the same.

We claim:

1. In an injection-blow molding apparatus of the type comprising first and second parallel stationary plates, a plurality of tie bars interconnecting said first and second stationary plates, an injection molding female mold secured to said first stationary plate, a movable die plate slidably mounted on said tie bars, a blow molding female mold secured to said movable die plate, and a male mold disposed between said injection molding female mold and said blow molding female mold and wherein a parison is injection molded about said male mold by the cooperation thereof with said injection molding female mold and then said male mold carrying said parison is combined with said blow molding female mold to blow mold said parison, the improvement which comprises:

a horizontal beam mounted on said first and second parallel stationary plates and extending above said tie bars in a direction substantially parallel to said tie bars and to the direction of movement of said movable die plate;

said male mold including a male mold supporting member having male molds on its opposite sides, and a vertical shaft supporting said male mold supporting member and extending substantially vertically to the direction of movement of said movable die plate;

a carriage rotatably supporting said vertical shaft and slidably mounted on said beam;

means for moving said carriage along said beam; and means mounted on said carriage for rotating said carriage about a vertical axis.

2. The injection-blow molding apparatus according to claim 1 which further includes means for supplying heated medium for regulating the temperature of said male mold and compressed gas for blow molding through said male mold supporting block.

* * * * *